UNITED STATES PATENT OFFICE.

CHARLES MANGAN FORD, OF DENVER, COLORADO, ASSIGNOR TO THE ANHYDROSINE COMPANY, OF SAME PLACE.

COMPOSITION OF MATTER FOR POULTICES, &c.

SPECIFICATION forming part of Letters Patent No. 673,769, dated May 7, 1901.

Application filed May 5, 1900. Serial No. 15,632. (Specimens.)

*To all whom it may concern:*

Be it known that I, CHARLES MANGAN FORD, of Denver, in the county of Arapahoe and State of Colorado, have invented a new and useful Improvement in Compositions of Matter, of which the following is a specification.

My invention is in the nature of a new composition of matter designed to take the place of the ordinary poultice and blistering materials, both of which for many reasons are objectionable. Most pathogenic processes depend to a great extent upon the presence of water, the removal of which in many cases promotes the cure of the diseased parts.

My composition of matter is specially applicable for tumors, abscesses, carbuncles, boils, and also for pneumonia, and it is designed to supply a material which while being always moist is at the same time hygroscopic, so as to absorb the watery secretions, and has also valuable anodyne and antiseptic qualities.

It consists in a mixture of sterilized and dehydrated clay and dehydrated glycerin with or without antiseptic or other medicaments.

The use of clay as an external medicinal application is very ancient. Moist clay in its native place and condition has for centuries been highly prized as an application to wounds, sores, bruises, &c., and I claim, therefore, nothing new in the use of this substance in its native state. Glycerin has also been used in poultices and dressings for inflammatory and painful affections; but all such compositions were entirely different in their preparation and action from mine, as will appear hereinafter.

My improvement consists in selecting a clay which shall be absolutely free from iron, lead, or other contaminating mineral in any form. It shall be, as nearly as possible, a pure natural basic silicate. It is then dried, ground, bolted, and heated to a temperature of 100° centigrade until entirely free from all water previously held, either chemically or mechanically. This heating process also accomplishes sterilization, which is an indispensable property of all applications to an inflamed or abraded surface. The glycerin, which in the purest state obtainable in the market contains five per cent. or more of water, is heated to a temperature of about 165° centigrade in the presence of sulfuric acid, but not in contact with the acid. The effect of this operation is to deprive this glycerin of all water and render it practically anhydrous. The dehydrated clay and anhydrous glycerin are then intimately mixed by the aid of suitable machinery in such proportions as will form a paste of such a consistency as can be easily spread at ordinary temperature with a spatula. Any harmless antiseptics are added during the process of mixing, such as benzoin, boric acid, or salicylate of methyl. The materials, which are now in the form of a paste, are put up as a new commercial product in hermetically-sealed cans, which prevent absorption of moisture from the air and insure permanence of its values.

My product by its hygroscopic character is able to stimulate the secretion of serous fluid without causing any discomfort to the patient, at the same time increasing and facilitating the circulation through the diseased parts. It is anodyne in character, without having any specific anodyne agent in its composition, and is entirely non-irritant to sensitive surfaces. Unlike the blister, when resorted to for that purpose its application may be continued indefinitely, since it absorbs water as long as its hygroscopic property is unsatisfied and does not raise a water-bladder.

In applying the paste it is preferably warmed with a dry heat without application of steam or hot water.

I am aware that modelers' clay has been mixed with glycerin to prolong its drying; but such composition was not hygroscopic, but in the very nature of the use to which it was applied must dry out, and besides neither the clay nor the glycerin used was anhydrous, as in my composition, nor were they sterilized.

I do not confine myself to any specific composition of clay or earth, as many inert basic substances of fine consistency and pulverulent nature may be employed when sterilized, dehydrated, and mixed with dehydrated glycerin.

What is meant by "inert basic substance" is any neutral or non-irritating substance which will give body to the compound and will be capable of sterilization by heat without undergoing chemical changes. The natural silicates occurring as clay are to be preferred; but it is obvious that many other neutral substances which are refractory under the heat of sterilization could be used.

Having thus described my invention, what I claim as new, and desire to secure by Letters Patent, is—

A new composition of matter consisting of sterilized and dehydrated basic powder, of a neutral, refractory, and non-irritating nature, and dehydrated glycerin mixed to the consistency of a paste substantially as and for the purpose described.

In testimony whereof I have signed my name to this specification in the presence of two subscribing witnesses.

CHARLES MANGAN FORD.

Witnesses:
DAVID W. BROWN,
JASON P. LA BELLE.